(12) United States Patent
Ford

(10) Patent No.: US 7,815,221 B2
(45) Date of Patent: Oct. 19, 2010

(54) GTANK-LC AND MINI-GTANK-LC

(76) Inventor: Gary A. Ford, 18530 SE. 145th St., Renton, WA (US) 98059

( * ) Notice: Subject to any disclaimer, the term of this patent is extended or adjusted under 35 U.S.C. 154(b) by 36 days.

(21) Appl. No.: 11/707,364

(22) Filed: Feb. 16, 2007

(65) Prior Publication Data

US 2007/0205594 A1 Sep. 6, 2007

Related U.S. Application Data

(60) Provisional application No. 60/774,721, filed on Feb. 17, 2006.

(51) Int. Cl.
*B62K 11/00* (2006.01)
(52) U.S. Cl. ...................................... 280/835
(58) Field of Classification Search ................. 280/834, 280/835; 180/219, 69.4; 137/571, 572, 899
See application file for complete search history.

(56) References Cited

U.S. PATENT DOCUMENTS

| 4,386,094 | A | * | 5/1983 | Butler et al. | 514/345 |
|---|---|---|---|---|---|
| 4,799,656 | A | * | 1/1989 | Puskarich | 269/17 |
| 5,975,574 | A | * | 11/1999 | Warth | 280/834 |
| 6,845,782 | B2 | * | 1/2005 | Osterkil et al. | 137/1 |
| 6,857,661 | B2 | * | 2/2005 | Waters | 280/830 |
| 7,255,190 | B1 | * | 8/2007 | Floro | 180/219 |
| 7,377,552 | B2 | * | 5/2008 | Miyabe | 280/835 |

* cited by examiner

*Primary Examiner*—Tony H. Winner

(57) ABSTRACT

The GTank-LC & Mini-GTank-LC 'Gtank' is a supplemental fuel storage/delivery system that connects to and becomes an integral part of the existing fuel storage/delivery system of the Suzuki Intruder 1500 LC, increasing its capacity by between 2.0 and 2.5 gallons all the while not disrupting the normal fuel flow or intended operation of the 'motorcycle'. This invention allows the operator to select fuel from either the existing fuel storage tank/cell or the new fuel storage tank/cell from either 'Gtank' during normal operation of the 'motorcycle' without disruption or adversely affecting its use.

8 Claims, 4 Drawing Sheets

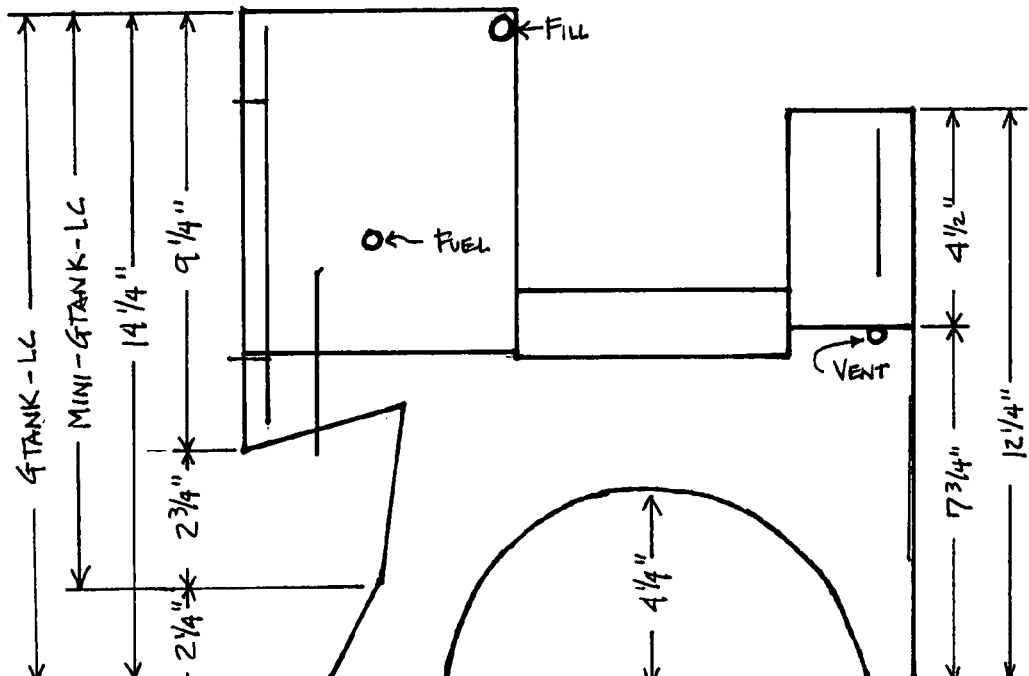
FIG 1 - TOP PLAN
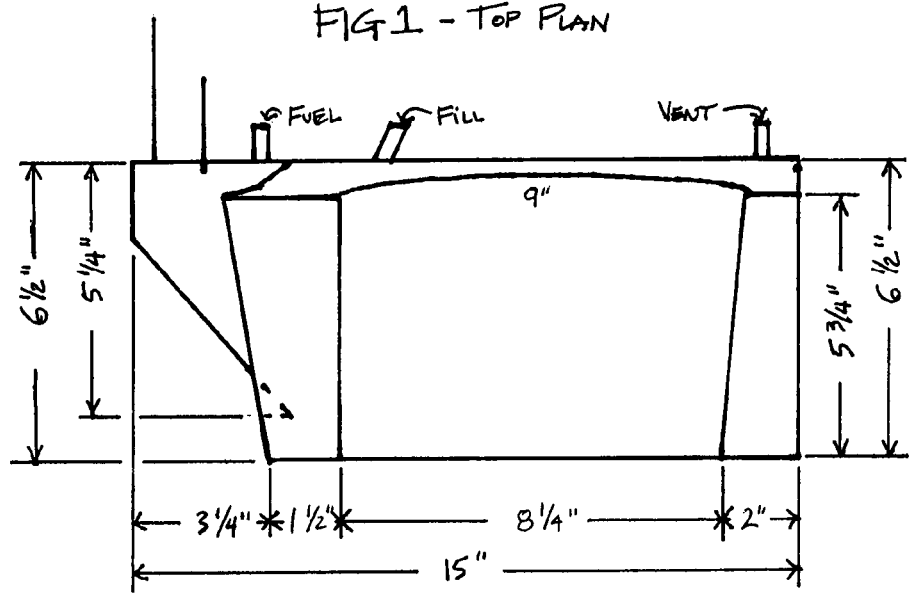
FIG 2 - REAR ELEVATION

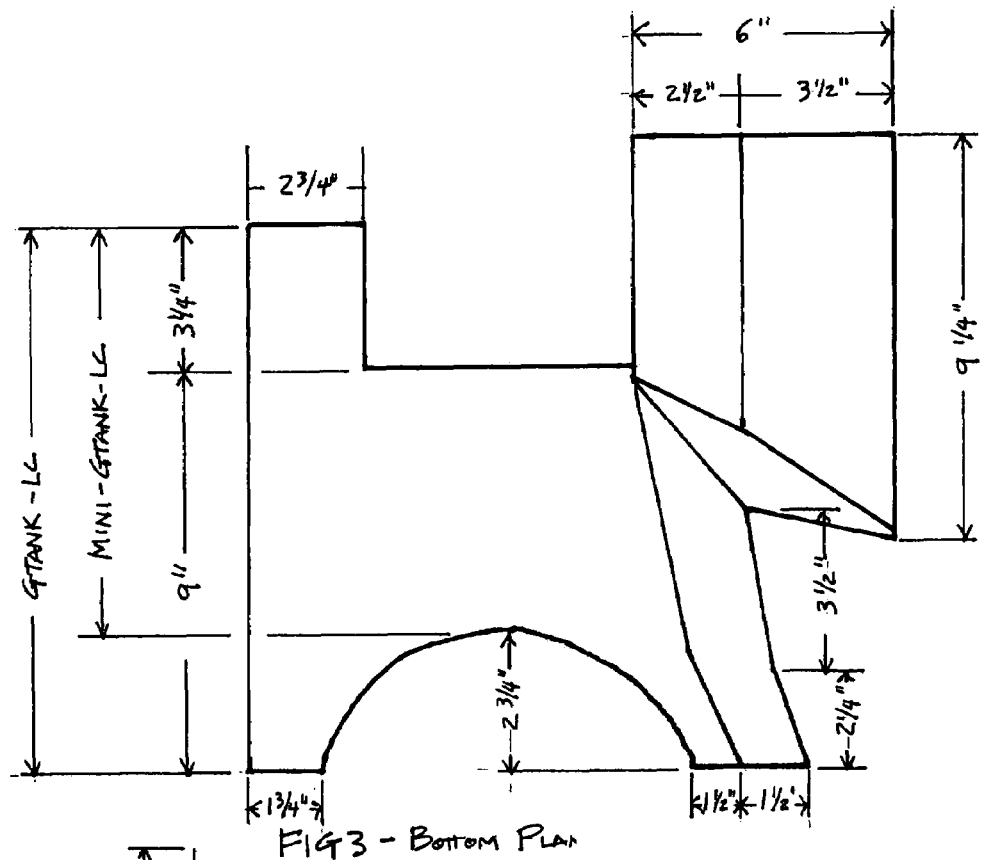
FIG 3 - Bottom Plan
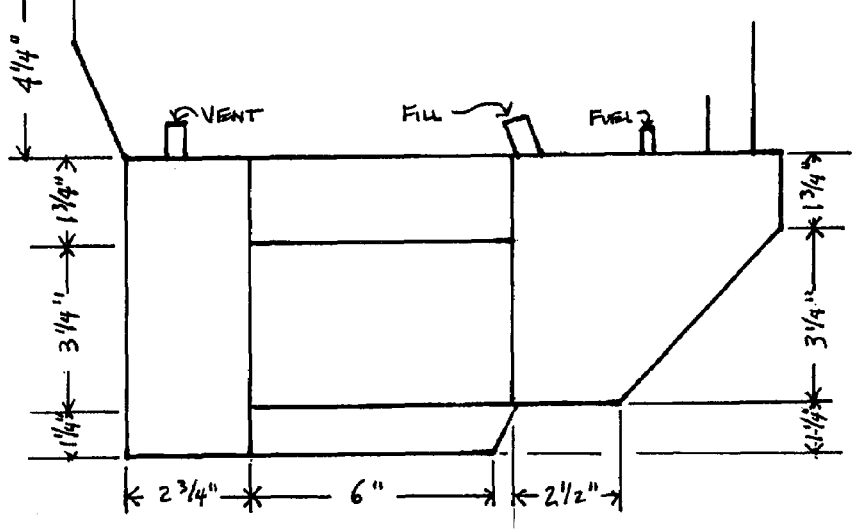
FIG 4 - Front Elevation

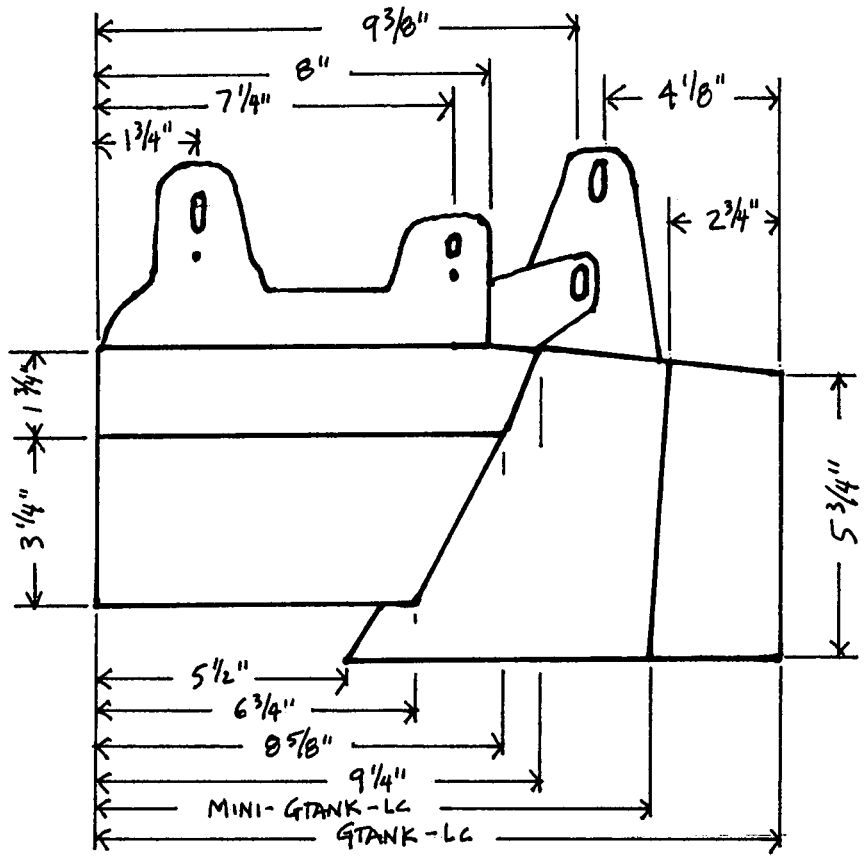
FIG 5 - LEFT ELEVATION
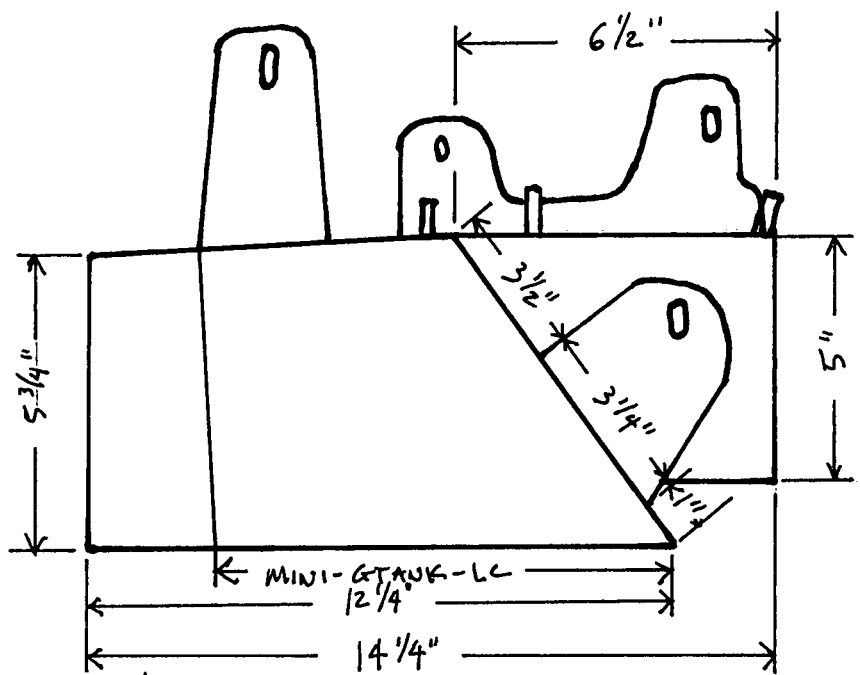
FIG 6 - RIGHT ELEVATION

Supplemental Fuel Storage/Delivery System

GTANK-LC AND MINI-GTANK-LC

CROSS REFERENCE TO RELATED APPLICATIONS

Application Claiming the Benefit under 35 USC 119(e)
Parent Application:: 60/774,721
Parent Filing Date:: Feb. 17, 2006

STATEMENT REGARDING FEDERALLY SPONSORED RESEARCH OR DEVELOPMENT

"Not Applicable"

REFERENCE OF SEQUENCE LISTING, A TABLE, OR A COMPUTER PROGRAM LISTING COMPACT DISC APPENDIX

"Not Applicable"

The 'GTank' consists of $1/10$" thick 50/52 aluminum panels cut, bent and welded into their noted shape and sizes, including three 1" protruding tubes for filling, venting and fuel pickup. The exterior of the 'GTank' is typically coated with a two-part Epoxy spray on Truck Bed Liner, but can be finished with any number of finishes or even polished to a shine. The 'GTank' is installed under the motorcycle between and above the motorcycles bottom frame rails and in front of the rear tire. The 'GTank' is secured in 4 locations from tabs provided on the 'GTank', utilizing existing frame bolt locations, two on each side of the 'GTank'. Each 'GTank has 4 pins, $1/4$' Diameter aluminum, allowing for re-securing of the stock chrome storage box cover to its original location on the motorcycle as part of the trim.

BACKGROUND OF INVENTION

A variety of new and older models of motorcycles have less than adequate fuel capacities that adversely limit their ability to be utilized for extended distances or in somewhat remote areas under certain conditions.

This limited storage capacity can also affect choice of planned routes based on limitations of available refueling locations and can even be dangerous due to miscalculations causing fuel shortages on busy roads.

BRIEF SUMMARY OF INVENTION

The installation and use of this supplemental fuel storage/delivery system, GTank-LC & Mini-GTank-LC, will greatly extend the usable range of the Suzuki Intruder 1500 LC, 'motorcycle', and allow for a greater and more diverse usage of the same.

This invention adds to the storage capacity of the 'motorcycle' by either 2.0 or 2.5 gallons. Effectively increasing its usable range by a minimum of 40% up to 61%, depending on which tank/cell is installed, the Mini-GTank-LC at 40%, or GTank-LC at 61%.

This invention also adds to and becomes an integral part of the 'motorcycle's fuel system without affecting emissions and/or normal usage and is designed to be used at the riders will without adversely affecting the originally designed operational parameters of the fuel system of the 'motorcycle'.

BRIEF DESCRIPTION OF SEVERAL VIEWS OF THE DRAWING

FIG. 1: Top Plan View of the GTank-LC and Mini-GTank-LC noting locations of the vent, fill and draw or fuel nipples, mounting brackets and overall shape and dimensions.

FIG. 2: Rear Elevation of the GTank-LC and Mini-GTank-LC noting locations of the vent, fill and draw or fuel nipples and overall shape and dimensions.

FIG. 3: Bottom Plan View of the GTank-LC and Mini-GTank-LC noting overall shape and dimensions.

FIG. 4: Front Elevation of the GTank-LG and Mini-GTank-LC noting locations of the vent, fill and draw or fuel nipples and overall shape and dimensions FIG. 5: Left Side Elevation of the GTank-LG and Mini-GTank-LC noting locations of the vent, fill and draw or fuel nipples, overall shape, dimensions and relational differences between the GTank-LC and the Mini-GTank-LC.

FIG. 6: Right Side Elevation of the GTank-LC and Mini-GTank-LC noting locations of the vent, fill and draw or fuel nipples, overall shape, dimensions and relational differences between the GTank-LC and the Mini-GTank-LC.

DETAILED DESCRIPTION OF INVENTION

Figure 7:
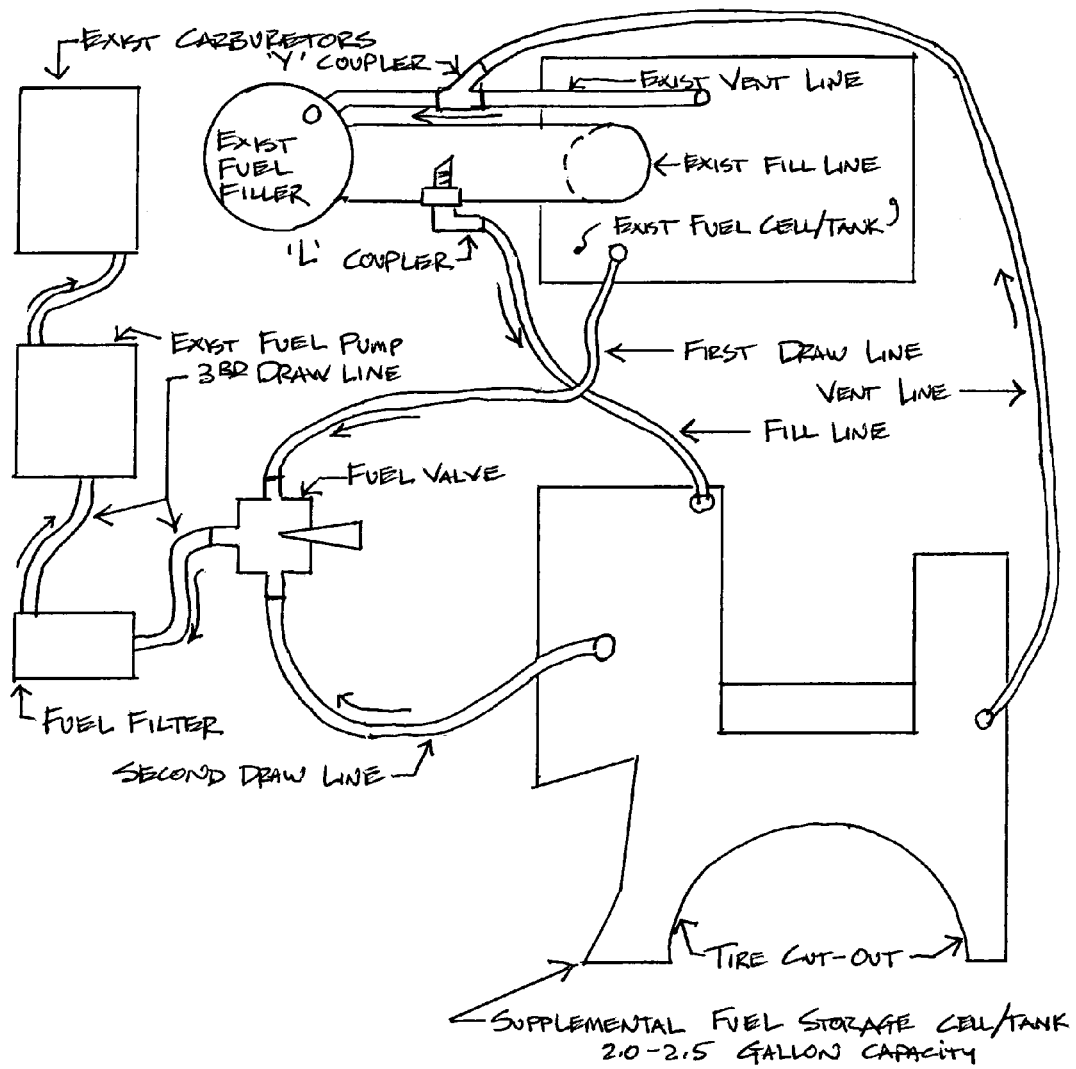
FIG. 7: A schematic of the complete supplemental fuel storage/delivery system, all relative components, new and existing, and their relationship to the invention and each other.

The GTank-LC & Mini GTank-LC, here-after referred to as 'GTank' are Supplemental Fuel Storage Cell/Tanks for the Suzuki Intruder 1500 LC, here after referred to as 'Motorcycle'. The 'GTank' is located between and above the bottom of the lower frame rails, in front of the rear tire, under the rear swing arm and behind and beside the rear shocks' lower connection point and is incorporated into and becomes an integral part of the stock fuel system of the 'Motorcycle' by the installation of this New Supplemental Fuel Storage Cell/Tank, Additional Fuel Lines/Couplers/Fuel Valve/Fuel Filter and Revised Fuel System as Designed/Drawn and Included here-in and as described in this Invention to enable its use as a an integral part of the 'Motorcycle' fuel supply and operation.

Clarification:

The only distinguishing difference between the GTank-LC and Mini-GTank-LC is the shortening of the 'ends' on the 'Rear Side' of the Mini-GTank-LC. The larger, GTank-LC, has a 2.5 gallon capacity, while the smaller Mini-GTank-LC has a 2.0 Gallon capacity, due to the shortened ends. All other aspects, use, locations, layout, parts and panels, except for the shortened end pieces are identical between the two versions.

Fuel Line Routing:
  Fill Line routes from the GTank Fill Nipple to 'L' coupler tapped into existing fill line.
  Vent Line routes from GTank Vent Nipple to 'Y' coupler tapped into existing vent line.
  First Draw Line routes from existing fuel storage tank to the top nipple of fuel valve.
  Second Draw Line routes from lower nipple of fuel valve to the GTank fuel nipple.
  Third Draw Line, first half, routes from fuel filter to existing fuel pump.
  Third Draw Line, second half, routes from center nipple of fuel valve to fuel filter.

Couplers 2 ea:
  The 'L' coupler connects 'GTank' fill hose to existing fuel filler hose allowing for simultaneous fuel cell/tank filling from stock fill location and is made from materials not affected by contact with fuel or fuel fumes, predominantly nylon.
  The 'Y' Connector ties 'GTank' vent hose into existing vent system to allow for simultaneous venting of both tanks utilizing stock venting system and is made from materials not affected by contact with fuel or fuel fumes, predominantly nylon.

Fuel Valve:

The fuel valve is a 2-way valve allowing rider to manually direct fuel flow from either the 'GTank' or stock fuel tank/cell to stock fuel pump at the discretion of the operator. The fuel valve is secured to the 'Motorcycle' in the area of the stock ignition switch and is accessible by the operator at any time before or during normal motorcycle operation.

Operation:

The operator fills 'GTank' simultaneously and in the same fuel filler location as stock fuel tank. 'GTank' requires slightly longer fill times due to its smaller ½ filler line, thus filling speed should be reduced after main tank is filled to reduce the potential for spillage. The filling process is complete when fuel visible in the stock filler neck no longer drains down into either tank/cell. Always perform filling operation while standing next to 'Motorcycle' with it on its kickstand and all power shut off.

The stored fuel of 'GTank' should be utilized first due to the lack of a fuel gauge, then rider/operator can redirect the fuel by moving the valve handle 180 degrees directing fuel to be drawn from main tank/cell, while operating 'motorcycle' under normal conditions. Operation of motorcycle continues, uninterrupted, while fuel consumption is being tracked through stock fuel gauge on stock fuel tank/cell.

What is claimed is as follows:

1. A motorcycle having a first existing fuel system, said first fuel system comprising:
   a fill line with a first and second ends, wherein said first end is connected to a first fuel tank;
   a vent line couple to said first tank;
   a first draw line operatively connected to said first tank and a fuel valve, and wherein the motorcycle further including a second fuel storage/delivery system, said second system comprising:
   a second fuel tank mountable to a rear end of the motorcycle frame;
   said second end of said fill line coupled to said second tank;
   a second vent line operatively connected to said second tank and said fuel valve;
   a third draw line operatively connected between said fuel valve and a fuel pump; and
   a fuel filter interposed between said fuel pump and said fuel valve.

2. The motorcycle of claim 1 wherein said second fuel tank is aluminum and welded to said rear end of said frame.

3. The motorcycle of claim 2 wherein said second fuel tank includes an exterior coating of spray-on epoxy.

4. The motorcycle of claim 1 wherein said second tank is formed, fitted and secured in position under said motorcycle between and above a lower portion of the frame rails and in front of a rear tire.

5. The motorcycle of claim 1 wherein said second tank includes either a 2.0 U.S. gallons or 2.5 U.S. gallons.

6. The motorcycle of claim 1 further comprising an L-shaped coupler, said coupler is fuel resistant and secured between said first tank and said fill line.

7. The motorcycle of claim 1 further comprising a 'Y' shaped fuel resistant coupler, said coupler secured between said first vent line and said second of said second vent line.

8. The motorcycle of claim 1, wherein said fuel valve diverts fuel through three nipple, one for said first draw line, one for said second draw line, one for said third draw line, with diverter handle to select fuel flow from between said draw lines coupled to said three nipples.

* * * * *